(12) United States Patent
Kim et al.

(10) Patent No.: US 9,982,757 B1
(45) Date of Patent: May 29, 2018

(54) PLANETARY GEAR TRAIN OF AUTOMATIC TRANSMISSION FOR VEHICLE

(71) Applicants: HYUNDAI MOTOR COMPANY, Seoul (KR); KIA MOTORS CORPORATION, Seoul (KR)

(72) Inventors: Jin Ho Kim, Suwon-si (KR); Dong Hwan Hwang, Seoul (KR); Jong Sool Park, Hwaseong-si (KR); Jong Soo Kim, Seoul (KR); Kyeong Hun Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days. days.

(21) Appl. No.: 15/715,444

(22) Filed: Sep. 26, 2017

(30) Foreign Application Priority Data

May 10, 2017 (KR) .......................... 10-2017-0058316

(51) Int. Cl.
*F16H 3/66* (2006.01)

(52) U.S. Cl.
CPC ....... *F16H 3/66* (2013.01); *F16H 2200/0069* (2013.01); *F16H 2200/2015* (2013.01); *F16H 2200/2046* (2013.01)

(58) Field of Classification Search
CPC .............. F16H 3/66; F16H 2200/0069; F16H 2200/2046; F16H 2200/2015
See application file for complete search history.

(56) References Cited

U.S. PATENT DOCUMENTS

| 2016/0169334 | A1* | 6/2016 | Cho ......................... F16H 3/66 475/275 |
| 2017/0167579 | A1* | 6/2017 | Hwang ..................... F16H 3/66 |
| 2017/0268608 | A1* | 9/2017 | Kwon ....................... F16H 3/66 |
| 2017/0268614 | A1* | 9/2017 | Kwon ....................... F16H 3/66 |

* cited by examiner

*Primary Examiner* — David J Hlavka
(74) *Attorney, Agent, or Firm* — Brinks Gilson & Lione

(57) ABSTRACT

The present disclosure provides a planetary gear train of an automatic transmission including: input and output shaft, first to fifth planetary gear sets respectively having first to third, fourth to sixth, seventh to ninth, tenth to twelfth, and thirteenth to fifteenth rotational elements, a first shaft connected with the second and fifth rotational elements and the input shaft, a second shaft connected with the fourteenth rotational element and the output shaft, a third shaft connected with the eighth and thirteenth rotational elements, a fourth shaft connected with the eleventh and the fifteenth rotational elements, a fifth shaft connected with the sixth rotational element, a sixth shaft connected with the ninth and twelfth rotational elements, a seventh shaft connected with the tenth rotational element, an eighth shaft connected with the first and seventh rotational elements, and a ninth shaft connected with the third and fourth rotational elements.

17 Claims, 2 Drawing Sheets

FIG. 2

| Shift-stage | Engagement element | | | | | | Gear ratio | Step ratio | Remark |
|---|---|---|---|---|---|---|---|---|---|
| | C1 | C2 | C3 | B1 | B2 | B3 | | | |
| D1 | ● | | | | | ● | 5.521 | – | |
| D2 | ● | | ● | | | ● | 3.378 | 1.634 | |
| D3 | | | ● | ● | | ● | 2.269 | 1.489 | |
| D4 | ● | ● | ● | | | | 1.642 | 1.382 | |
| D5 | | ● | ● | ● | | | 1.41 | 1.165 | |
| D6 | | ● | | ● | | | 1.158 | 1.218 | Gear ratio span : 9.5 |
| D7 | | ● | ● | ● | | | 1 | 1.158 | R/D1 ratio : 0.8 |
| D8 | | | | | ● | | 0.799 | 1.252 | |
| D9 | ● | | ● | | ● | | 0.65 | 1.229 | |
| D10 | ● | | ● | | ● | | 0.58 | 1.121 | |
| REV | ● | | | | ● | ● | -4.397 | – | |

PLANETARY GEAR TRAIN OF AUTOMATIC TRANSMISSION FOR VEHICLE

CROSS-REFERENCE TO RELATED APPLICATION

This present application claims priority to and the benefit of Korean Patent Application No. 10-2017-0058316 filed on May 10, 2017, which is incorporated herein by reference in its entirety.

FIELD

The present disclosure relates to an automatic transmission for a vehicle.

BACKGROUND

The statements in this section merely provide background information related to the present disclosure and may not constitute prior art.

In the field of an automatic transmission, more multiplicity of shift-stages is useful technology for enhancement of fuel consumption and drivability of a vehicle.

Achieving more shift stages contributes to improve performance and efficiency of a vehicle in a trend so-called downsizing of an engine, and more linearity in step ratios of the shift-stages enhances drivability of the vehicle by improving uniformity of acceleration before and after a shifting, etc.

In order to achieve more shift-stages for an automatic transmission, the number of parts is typically increased, which may negatively affect installability, production cost, weight and/or power flow efficiency.

Therefore, in order to enhance fuel consumption of an automatic transmission having more shift-stages, it is desired that better efficiency is derived with less number of parts.

In this asepct, an eight-speed automatic transmission has been introduced recently and a planetary gear train for an automatic transmission enabling more shift-stages has been investigated.

A recent eight-speed automatic transmission typically shows a gear ratio span, which is a significant factor for securing linearity of step ratios, in a level of 6.5 to 7.5.

In addition, we have discovered that an eight-speed automatic transmission may become inferior in respect of linearity of step ratios of shift-stages even if the gear ratio span may rise a level above 9.0.

SUMMARY

The present disclosure provides a planetary gear train realizing ten forward speeds and at least one reverse speed by utilizing five planetary gear sets and six engagement elements, thereby reducing a drag loss and improving power delivery efficiency and fuel consumption.

Also, the present disclosure employs a torque-in-parallel scheme to an output side planetary gear set, thereby reducing torque loads of engagement elements and improving torque delivery efficiency and durability.

In addition, the present disclosure improves flexibility of output gear ratio, thereby improving linearity of step ratios of shift-stages.

One form of planetary gear train of an automatic transmission for a vehicle may include: an input shaft, an output shaft, first to fifth planetary gear sets respectively having first to third, fourth to sixth, seventh to ninth, tenth to twelfth, and thirteenth to fifteenth rotational elements, a first shaft fixedly connected with the second and fifth rotational elements, and the input shaft, a second shaft fixedly connected with the fourteenth rotational element and the output shaft, a third shaft fixedly connected with the eighth and thirteenth rotational elements, a fourth shaft fixedly connected with the eleventh and the fifteenth rotational elements, a fifth shaft fixedly connected with the sixth rotational element, a sixth shaft fixedly connected with the ninth and twelfth rotational elements, a seventh shaft fixedly connected with the tenth rotational element, an eighth shaft fixedly connected with the first and seventh rotational elements, and a ninth shaft fixedly connected with the third and fourth rotational elements.

The planetary gear train may further include six engagement elements, each of which configured to selectively connect a corresponding pair among the first to ninth shaft, the input shaft, the output shaft, and the transmission housing, wherein three engagement elements are configured to operate for respective shift-stages.

The six engagement element may include three clutches and three brakes.

The six engagement elements may include: a first clutch arranged between the first shaft and the seventh shaft, a second clutch arranged between the third shaft and the fifth shaft, a third clutch arranged between the fourth shaft and the fifth shaft, a first brake arranged between the eighth shaft and the transmission housing, a second brake arranged between the ninth shaft and the transmission housing, and a third brake arranged between the third shaft and the transmission housing.

The first, second, and third rotational elements may be a first sun gear, a first planet carrier, and a first ring gear of the first planetary gear set. The fourth, fifth, and sixth rotational elements may be a second sun gear, a second planet carrier, and a second ring gear of the second planetary gear set. The seventh, eighth, and ninth rotational elements may be a third sun gear, a third planet carrier, and a third ring gear of the third planetary gear set. The tenth, eleventh, and twelfth rotational elements may be a fourth sun gear, a fourth planet carrier, and a fourth ring gear of the fourth planetary gear set. The thirteenth, fourteenth, and fifteenth rotational elements may be a fifth sun gear, a fifth planet carrier, and a fifth ring gear of the fifth planetary gear set.

The first, second, third, fourth, and fifth planetary gear sets may be arranged in an order of the second, first, third, fourth, fifth planetary gear sets from an engine side.

Another form of the present disclosure utilizes five planetary gear sets operated by six engagement elements, and thereby achieves the ten forward speeds and at least one reverse speed.

In addition, the gear ratio span of at least 9.5 may be achieved so as to enhance an engine driving efficiency, and a linearity of step ratios of shift-stages may be also improved, thereby contributing to a better drivability of the vehicle.

While achieving ten forward speeds and at least one reverse speed, engagement element operation is minimized so as to reduce a drag loss, thereby improving power delivery efficiency and fuel efficiency.

A torque-in-parallel scheme is applied to an output side planetary gear set, and thus the torque loads may be evenly distributed to planetary gear sets and engagement elements, thereby improving torque delivery efficiency and durability.

By using five planetary gear sets to realize ten forward speeds and at least one reverse speed, wider range of output gear ratios may be achieved, thereby improving linearity in step ratios of shift-stages.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is an operational chart of engagement elements for respective shift-stages applied to a planetary gear train.

Figure 1:
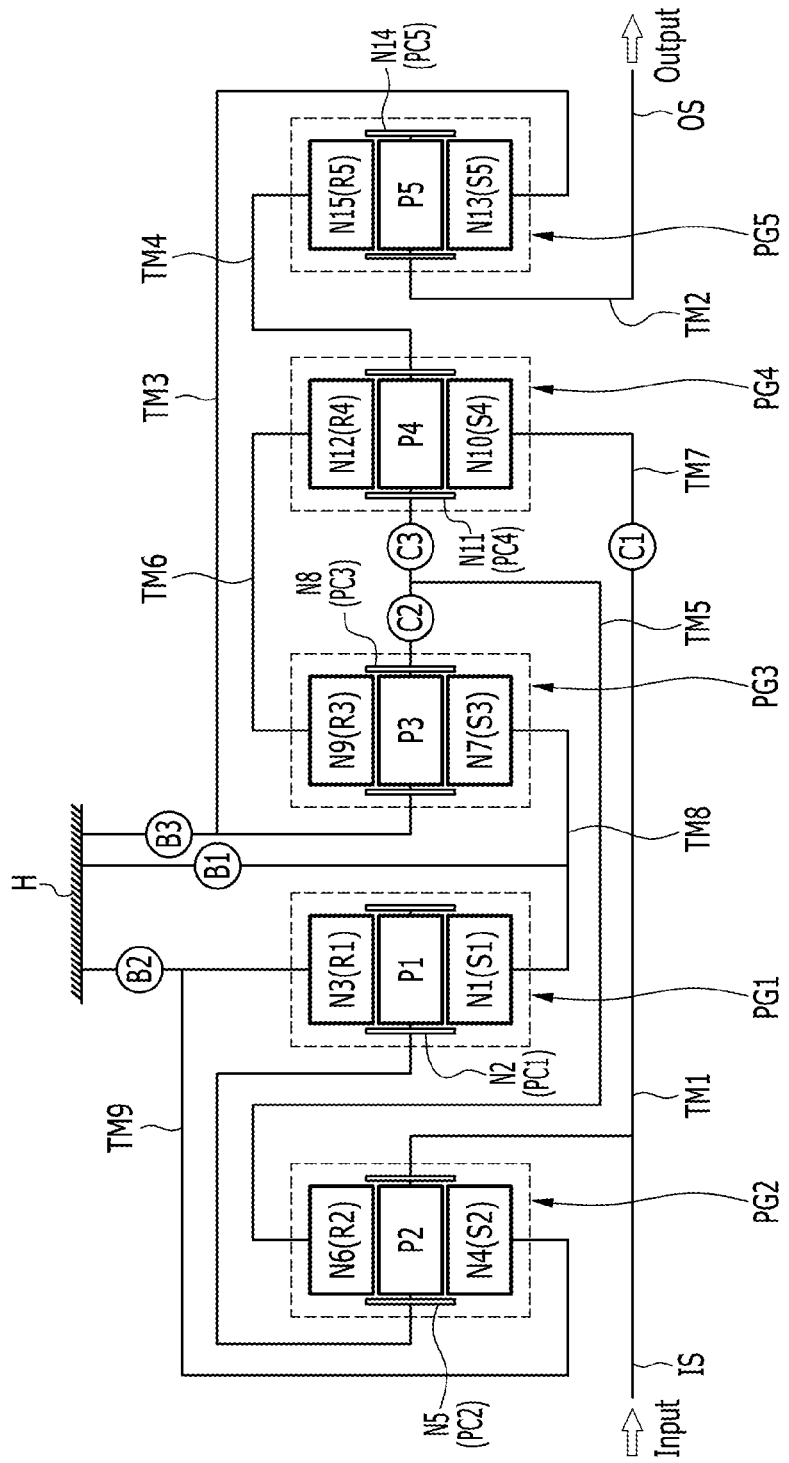
FIG. 1 is a schematic diagram of a planetary gear train.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, dividing names of components into first, second and the like is to divide the names because the names of the components are the same as each other and an order thereof is not particularly limited. Further, as used herein, description of elements being "fixedly" connected or interconnected includes elements that are always connected directly or indirectly, such that the fixedly connected elements always rotate at a same speed.

FIG. 1 is a schematic diagram of a planetary gear train according to an exemplary form of the present disclosure.

Referring to FIG. 1, a planetary gear train according to an exemplary form of the present disclosure includes first, second, third, fourth, and fifth planetary gear sets PG1, PG2, PG3, PG4, and PG5 arranged on a same axis, an input shaft IS, an output shaft OS, nine shafts TM1 to TM9 interconnecting rotational elements of the first, second, third, fourth, and fifth planetary gear sets PG1, PG2, PG3, PG4, and PG5, engagement elements of three clutches C1 to C3 and three brakes B1 to B3, and a transmission housing H.

A torque of an engine input to the input shaft IS is shifted by cooperative operation of the first, second, third, fourth, and fifth planetary gear sets PG1, PG2, PG3, PG4, and PG5, and a shifted torque is output through the output shaft OS.

In some forms of the present disclosure, the planetary gear sets are arranged in the order of the second, first, third, fourth, and fifth planetary gear sets PG2, PG1, PG3, PG4, and PG5, from an engine side.

The input shaft IS is an input member and the torque from a crankshaft of an engine is input into the input shaft IS, after being torque-converted through a torque converter.

The output shaft OS is an output member arranged on the same axis with the input shaft IS, and transmits the shifted torque to a drive shaft through a differential apparatus.

The first planetary gear set PG1 is a single pinion planetary gear set, and includes a first sun gear S1, a first planet carrier PC1 rotatably supporting a plurality of first pinion gears P1 externally gear-meshed with the first sun gear S1, and a first ring gear R1 internally gear-meshed with the plurality of first pinion gears P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second sun gear S2, a second planet carrier PC2 rotatably supporting a plurality of second pinion gears P2 externally gear-meshed with the second sun gear S2, and a second ring gear R2 internally gear-meshed with the plurality of second pinion gears P2. The second sun gear S2 acts as a fourth rotational element N4, the second planet carrier PC2 acts as a fifth rotational element N5, and the second ring gear R2 acts as a sixth rotational element N6.

The third planetary gear set PG3 is a single pinion planetary gear set, and includes a third sun gear S3, a third planet carrier PC3 rotatably supporting a plurality of third pinion gears P3 externally gear-meshed with the third sun gear S3, and a third ring gear R3 internally gear-meshed with the plurality of third pinion gears P3. The third sun gear S3 acts as a seventh rotational element N7, the third planet carrier PC3 acts as a eighth rotational element N8, and the third ring gear R3 acts as a ninth rotational element N9.

The fourth planetary gear set PG4 is a single pinion planetary gear set, and includes a fourth sun gear S4, a fourth planet carrier PC4 rotatably supporting a plurality of fourth pinion gears P4 externally gear-meshed with the fourth sun gear S4, and a fourth ring gear R4 internally gear-meshed with the plurality of fourth pinion gears P4. The fourth sun gear S4 acts as a tenth rotational element N10, the fourth planet carrier PC4 acts as a eleventh rotational element N11, and the fourth ring gear R4 acts as a twelfth rotational element N12.

The fifth planetary gear set PG5 is a single pinion planetary gear set, and includes a fifth sun gear S5, a fifth planet carrier PC5 rotatably supporting a plurality of fifth pinion gears P5 externally gear-meshed with the fifth sun gear S5, and a fifth ring gear R5 internally gear-meshed with the plurality of fifth pinion gears P5. The fifth sun gear S5 acts as a thirteenth rotational element N13, the fifth planet carrier PC5 acts as a fourteenth rotational element N14, and the fifth ring gear R5 acts as a fifteenth rotational element N15.

In the arrangement of the first, second, third, fourth, and fifth planetary gear sets PG1, PG2, PG3, PG4, and PG5, the first rotational element N1 and the seventh rotational element N7 are fixedly interconnected, the second rotational element N2 and the fifth rotational element N5 are fixedly interconnected, the third rotational element N3 and the fourth rotational element N4 are fixedly interconnected, the eighth rotational element N8 and the thirteenth rotational element N13 are fixedly interconnected, the ninth rotational element N9 and the twelfth rotational element N12 are fixedly interconnected, the eleventh rotational element N11 and the fifteenth rotational element N15 are fixedly interconnected, and nine shafts TM1 to TM9 are formed.

The nine shafts TM1 to TM9 are hereinafter described in detail.

Each of the ten shafts TM1 to TM9 may be a rotational member that fixedly interconnects the input and output shafts and rotational elements of the planetary gear sets PG1, PG2, PG3, PG4, and PG5, or may be a rotational member that selectively interconnects a rotational element to the transmission housing H, or may be a fixed member fixed to the transmission housing H.

The first shaft TM1 is connected with the second rotational element N2 (first planet carrier PC1) and the fifth rotational element N5 (second planet carrier PC2), and fixedly connected with the input shaft IS, thereby always acting as an input element.

The second shaft TM2 is connected with the fourteenth rotational element N14 (fifth planet carrier PC5), and fixedly connected with the output shaft OS, thereby always acting as an output element.

The third shaft TM3 is connected with the eighth rotational element N8 (third planet carrier PC3) and the thirteenth rotational element N13 (fifth sun gear S5).

The fourth shaft TM4 is connected with the eleventh rotational element N11 (fourth planet carrier PC4) and the fifteenth rotational element N15 (fifth ring gear R5).

The fifth shaft TM5 is connected with sixth rotational element N6 (second ring gear R2).

The sixth shaft TM6 is connected with the ninth rotational element N9 (third ring gear R3) and the twelfth rotational element N12 (fourth ring gear R4).

The seventh shaft TM7 is connected with tenth rotational element N10 (fourth sun gear S4).

The eighth shaft TM8 is connected with the first rotational element N1 (first sun gear S1) and the seventh rotational element N7 (third sun gear S3).

The ninth shaft TM9 is connected with the third rotational element N3 (first ring gear R1) and the fourth rotational element N4 (second sun gear S2).

The first shaft TM1 is selectively connected with the seventh shaft TM7, and the third shaft TM3 and the fourth shaft TM4 are selectively connected with the fifth shaft TM5.

In addition, the third shaft TM3, the eighth shaft TM8, and ninth shaft TM9 are selectively connected with the transmission housing H, thereby selectively acting as a fixed element.

The three engagement elements of clutches C1, C2, and C3 are arranged between the nine shafts TM1 to TM9, the input shaft IS, and the output shaft OS, so as to form selective connections.

The three engagement elements of brakes B1, B2, and B3 are arranged between the nine shafts TM1 to TM9 and the transmission housing H, so as to form selective connections.

The six engagement element of the three clutches C1 to C3 and the three brakes B1 to B3 are arranged as follows.

The first clutch C1 is arranged between the first shaft TM1 and the seventh shaft TM7, and selectively connects the first shaft TM1 and the seventh shaft TM7, thereby controlling power delivery therebetween.

The second clutch C2 is arranged between the third shaft TM3 and the fifth shaft TM5, and selectively connects the third shaft TM3 and the fifth shaft TM5, thereby controlling power delivery therebetween.

The third clutch C3 is arranged between the fourth shaft TM4 and the fifth shaft TM5, and selectively connects the fourth shaft TM4 and the fifth shaft TM5, thereby controlling power delivery therebetween.

The first brake B1 is arranged between the eighth shaft TM8 and the transmission housing H, and selectively connects the eighth shaft TM8 to the transmission housing H.

The second brake B2 is arranged between the ninth shaft TM9 and the transmission housing H, and selectively connects the ninth shaft TM9 to the transmission housing H.

The third brake B3 is arranged between the third shaft TM3 and the transmission housing H, and selectively connects the third shaft TM3 to the transmission housing H.

The engagement elements of the first, second, and third clutches C1, C2, and C3 and the first, second, and third brakes B1, B2, and B3 may be realized as multi-plate hydraulic pressure friction devices that are frictionally engaged by hydraulic pressure, however, it should not be understood to be limited thereto, since various other configuration that are electrically controllable may be available.

FIG. 2 is an operational chart of engagement elements for respective shift-stages applied to a planetary gear train in some forms of the present disclosure.

Referring to FIG. 2, a planetary gear train in some forms of the present disclosure realizes ten forward speeds and at least one reverse speed by operating three engagements among the first, second, and third clutches C1, C2, and C3 and first, second, third brake B1, B2, and B3.

In the forward first speed D1, the first clutch C1 and the first and third brakes B1 and B3 are simultaneously operated.

As a result, the first shaft TM1 is connected with the seventh shaft TM7 by the operation of the first clutch C1. In this state, the input torque is input to the first shaft TM1.

In addition, the eighth and third shafts TM8 and TM3 respectively act as fixed elements by the operation of the first and third brakes B1 and B3, thereby realizing the forward first speed and outputting a shifted torque to the output shaft OS connected with the second shaft TM2.

In the forward second speed D2, the first and third clutches C1 and C3 and the third brake B3 are simultaneously operated.

As a result, the first shaft TM1 is connected with the seventh shaft TM7 by the operation of the first clutch C1, and the fourth shaft TM4 is interconnected with the fifth shaft TM5 by the operation of the third clutch C3. In this state, the input torque is input to the first shaft TM1.

In addition, third shaft TM3 acts as a fixed element by the operation of the third brake B3, thereby realizing the forward second speed and outputting a shifted torque to the output shaft OS connected with the second shaft TM2.

In the forward third speed D3, the third clutch C3 and the first and third brakes B1 and B3 are simultaneously operated.

As a result, the fourth shaft TM4 is connected with the fifth shaft TM5 by the operation of the third clutch C3. In this state, the input torque is input to the first shaft TM1.

In addition, the eighth and third shafts TM8 and TM3 respectively act as fixed elements by the operation of the first and third brakes B1 and B3, thereby realizing the forward third speed and outputting a shifted torque to the output shaft OS connected with the second shaft TM2.

In the forward fourth speed D4, the first and third clutches C1 and C3 and the first brake B1 are simultaneously operated.

As a result, the first shaft TM1 is connected with the seventh shaft TM7 by the operation of the first clutch C1, and the fourth shaft TM4 is interconnected with the fifth shaft TM5 by the operation of the third clutch C3. In this state, the input torque is input to the first shaft TM1.

In addition, eighth shaft TM8 acts as a fixed element by the operation of the first brake B1, thereby realizing the forward fourth speed and outputting a shifted torque to the output shaft OS connected with the second shaft TM2.

In the forward fifth speed D5, the second and third clutches C2 and C3 and the first brake B1 are simultaneously operated.

As a result, the third shaft TM3 is connected with the fifth shaft TM5 by the operation of the second clutch C2, and the fourth shaft TM4 is interconnected with the fifth shaft TM5 by the operation of the third clutch C3. In this state, the input torque is input to the first shaft TM1.

In addition, eighth shaft TM8 acts as a fixed element by the operation of the first brake B1, thereby realizing the forward fifth speed and outputting a shifted torque to the output shaft OS connected with the second shaft TM2.

In the forward sixth speed D6, the first and second clutch C1 and C2 and the first brake B1 are simultaneously operated.

As a result, the first shaft TM1 is connected with the seventh shaft TM7 by the operation of the first clutch C1, and the third shaft TM3 is interconnected with the fifth shaft TM5 by the operation of the second clutch C2. In this state, the input torque is input to the first shaft TM1.

In addition, eighth shaft TM8 acts as a fixed element by the operation of the first brake B1, thereby realizing the forward sixth speed and outputting a shifted torque to the output shaft OS connected with the second shaft TM2.

In the forward seventh speed D7, the first, second, and third clutches C1, C2, and C3 are simultaneously operated.

As a result, the first shaft TM1 is connected with the seventh shaft TM7 by the operation of the first clutch C1, third shaft TM3 is connected with the fifth shaft TM5 by the operation of the second clutch C2, and the fourth shaft TM4 is interconnected with the fifth shaft TM5 by the operation of the third clutch C3. In this state, the input torque is input to the first shaft TM1.

Then, the first, second, third, fourth, and fifth planetary gear sets PG1, PG2, PG3, PG4, and PG5 integrally rotate, and the torque received at the first shaft TM1 is outputted as inputted, thereby realizing the forward seventh speed and outputting a shifted torque through the output shaft OS connected with the second shaft TM2.

In the forward eighth speed D8, the first and second clutch C1 and C2 and the second brake B2 are simultaneously operated.

As a result, the first shaft TM1 is connected with the seventh shaft TM7 by the operation of the first clutch C1, and the third shaft TM3 is interconnected with the fifth shaft TM5 by the operation of the second clutch C2. In this state, the input torque is input to the first shaft TM1.

In addition, the ninth shaft TM9 acts as a fixed element by the operation of the second brake B2, thereby realizing the forward eighth speed and outputting a shifted torque to the output shaft OS connected with the second shaft TM2.

In the forward ninth speed D9, the second and third clutches C2 and C3 and the second brake B2 are simultaneously operated.

As a result, the third shaft TM3 is connected with the fifth shaft TM5 by the operation of the second clutch C2, and the fourth shaft TM4 is interconnected with the fifth shaft TM5 by the operation of the third clutch C3. In this state, the input torque is input to the first shaft TM1.

In addition, the ninth shaft TM9 acts as a fixed element by the operation of the second brake B2, thereby realizing the forward ninth speed and outputting a shifted torque to the output shaft OS connected with the second shaft TM2.

In the forward tenth speed D10, the first and third clutches C1 and C3 and the second brake B2 are simultaneously operated.

As a result, the first shaft TM1 is connected with the seventh shaft TM7 by the operation of the first clutch C1, and the fourth shaft TM4 is interconnected with the fifth shaft TM5 by the operation of the third clutch C3. In this state, the input torque is input to the first shaft TM1.

In addition, the ninth shaft TM9 acts as a fixed element by the operation of the second brake B2, thereby realizing the forward tenth speed and outputting a shifted torque to the output shaft OS connected with the second shaft TM2.

In the reverse speed REV, the first clutch C1 and the second and third brakes B2 and B3 are simultaneously operated.

As a result, the first shaft TM1 is connected with the seventh shaft TM7 by the operation of the first clutch C1. In this state, the input torque is input to the first shaft TM1.

In addition, the ninth and third shafts TM9 and TM3 respectively act as fixed elements by the operation of the second and third brakes B2 and B3, thereby realizing the reverse speed and outputting a shifted torque to the output shaft OS connected with the second shaft TM2.

As described above, a planetary gear train in some forms of the present disclosure utilizes five planetary gear sets PG1, PG2, PG3, PG4, and PG5 operated by six engagement elements of three clutches C1, C2, and C3 and three brakes B1, B2, and B3, and thereby achieves the ten forward speeds and at least one reverse speed.

In addition, the gear ratio span of at least 9.5 may be achieved so as to enhance an engine driving efficiency, and a linearity of step ratios of shift-stages may be improved as well, thereby contributing to a better drivability of the vehicle.

While achieving ten forward speeds and at least one reverse speed, engagement element operation is minimized so as to reduce a drag loss, thereby improving power delivery efficiency and fuel efficiency.

A torque-in-parallel scheme is applied to an output side planetary gear set, and thus the torque loads may be evenly distributed to planetary gear sets and engagement elements, thereby improving torque delivery efficiency and durability.

By using five planetary gear sets to realize ten forward speeds and at least one reverse speed, wider range of output gear ratios may be achieved, thereby improving linearity in step ratios of shift-stages.

The description of the disclosure is merely exemplary in nature and, thus, variations that do not depart from the substance of the disclosure are intended to be within the scope of the disclosure. Such variations are not to be regarded as a departure from the spirit and scope of the disclosure.

<Description of symbols>
PG1, PG2, PG3, PG4, PG5: first, second, third, fourth, and fifth planetary gear sets
S1,S2,S3,S4,S5: first, second, third, fourth, and fifth sun gears
PC1,PC2,PC3,PC4,PC5: first, second, third, fourth, and fifth planet carriers
R1,R2,R3,R4,R5: first, second, third, fourth, and fifth ring gears
C1, C2, C3: first, second, and third clutches
B1, B2, B3: first, second, and third brakes
IS: input shaft
OS: output shaft
TM1, TM2, TM3, TM4, TMS, TM6, TM7, TM8, TM9: first, second, third, fourth,
fifth, sixth, seventh, eighth, and ninth shafts

What is claimed is:
1. A planetary gear train of an automatic transmission for a vehicle, comprising:
    an input shaft configured to receive an external torque;
    an output shaft configured to output a shifted torque;
    a first planetary gear set having first, second, and third rotational elements;
    a second planetary gear set having fourth, fifth, and sixth rotational elements;

a third planetary gear set having seventh, eighth, and ninth rotational elements;
a fourth planetary gear set having tenth, eleventh, and twelfth rotational elements;
a fifth planetary gear set having thirteenth, fourteenth, and fifteenth rotational elements;
a first shaft fixedly connected with the second rotational element, the fifth rotational element, and the input shaft;
a second shaft fixedly connected with the fourteenth rotational element and the output shaft;
a third shaft fixedly connected with the eighth rotational element and the thirteenth rotational element;
a fourth shaft fixedly connected with the eleventh rotational element and the fifteenth rotational element;
a fifth shaft fixedly connected with the sixth rotational element;
a sixth shaft fixedly connected with the ninth rotational element and the twelfth rotational element;
a seventh shaft fixedly connected with the tenth rotational element;
an eighth shaft fixedly connected with the first rotational element and the seventh rotational element; and
a ninth shaft fixedly connected with the third rotational element and the fourth rotational element.

2. The planetary gear train of claim 1, further comprising:
six engagement elements, wherein each engagement element is configured to selectively connect a corresponding pair among the first to ninth shaft, the input shaft, the output shaft, and the transmission housing, and wherein three engagement elements are configured to operate for respective shift-stages.

3. The planetary gear train of claim 2, wherein the six engagement elements comprise three clutches and three brakes.

4. The planetary gear train of claim 2, wherein the six engagement elements comprise:
a first clutch arranged between the first shaft and the seventh shaft;
a second clutch arranged between the third shaft and the fifth shaft;
a third clutch arranged between the fourth shaft and the fifth shaft;
a first brake arranged between the eighth shaft and the transmission housing;
a second brake arranged between the ninth shaft and the transmission housing; and
a third brake arranged between the third shaft and the transmission housing.

5. The planetary gear train of claim 1, wherein:
the first, second, and third rotational elements of the first planetary gear set are respectively a first sun gear, a first planet carrier, and a first ring gear of the first planetary gear set;
the fourth, fifth, and sixth rotational elements of the second planetary gear set are respectively a second sun gear, a second planet carrier, and a second ring gear of the second planetary gear set;
the seventh, eighth, and ninth rotational elements of the third planetary gear set are respectively a third sun gear, a third planet carrier, and a third ring gear of the third planetary gear set;
the tenth, eleventh, and twelfth rotational elements of the fourth planetary gear set are respectively a fourth sun gear, a fourth planet carrier, and a fourth ring gear of the fourth planetary gear set; and
the thirteenth, fourteenth, and fifteenth rotational elements of the fifth planetary gear set are respectively a fifth sun gear, a fifth planet carrier, and a fifth ring gear of the fifth planetary gear set.

6. The planetary gear train of claim 1, wherein the first, second, third, fourth, and fifth planetary gear sets are arranged in an order of the second, first, third, fourth, fifth planetary gear sets from an engine side.

7. A planetary gear train of an automatic transmission for a vehicle, comprising:
an input shaft configured to receive an engine torque;
an output shaft configured to output a shifted torque;
a first planetary gear set having first, second, and third rotational elements;
a second planetary gear set having fourth, fifth, and sixth rotational elements;
a third planetary gear set having seventh, eighth, and ninth rotational elements;
a fourth planetary gear set having tenth, eleventh, and twelfth rotational elements;
a fifth planetary gear set having thirteenth, fourteenth, and fifteenth rotational elements;
a first shaft fixedly connected with the second rotational element, the fifth rotational element, and the input shaft;
a second shaft fixedly connected with the fourteenth rotational element and the output shaft;
a third shaft fixedly connected with the eighth rotational element and the thirteenth rotational element;
a fourth shaft fixedly connected with the eleventh rotational element and the fifteenth rotational element;
a fifth shaft fixedly connected with the sixth rotational element;
a sixth shaft fixedly connected with the ninth rotational element and the twelfth rotational element; and
a seventh shaft fixedly connected with the tenth rotational element; and
a plurality of shafts comprising a rotation element of the first, second, and third planetary gear set that is not fixedly connected with any of the first to seventh shafts, wherein any shaft of the plurality of shafts is configured to selectively connect to the transmission housing.

8. The planetary gear train of claim 7, wherein the plurality of shafts comprise:
an eighth shaft fixedly connected with the first rotational element and the seventh rotational element; and
a ninth shaft fixedly connected with the third rotational element and the fourth rotational element.

9. The planetary gear train of claim 8, further comprising:
three clutches, each of the three clutches configured to interconnect any two shafts selected from the nine shafts; and
three brakes, each of the three brakes configured to selectively connect a corresponding shaft among the nine shafts to the transmission housing, wherein the corresponding shaft is not connected with the input shaft or the output shaft.

10. The planetary gear train of claim 9, wherein the three clutches comprise:
a first clutch arranged between the first shaft and the seventh shaft;
a second clutch arranged between the third shaft and the fifth shaft; and
a third clutch arranged between the fourth shaft and the fifth shaft, and
wherein the three brakes comprise:

a first brake arranged between the eighth shaft and the transmission housing;
a second brake arranged between the ninth shaft and the transmission housing; and
a third brake arranged between the third shaft and the transmission housing.

11. The planetary gear train of claim 7, wherein:
the first, second, and third rotational elements of the first planetary gear set are respectively a first sun gear, a first planet carrier, and a first ring gear of the first planetary gear set;
the fourth, fifth, and sixth rotational elements of the second planetary gear set are respectively a second sun gear, a second planet carrier, and a second ring gear of the second planetary gear set;
the seventh, eighth, and ninth rotational elements of the third planetary gear set are respectively a third sun gear, a third planet carrier, and a third ring gear of the third planetary gear set;
the tenth, eleventh, and twelfth rotational elements of the fourth planetary gear set are respectively a fourth sun gear, a fourth planet carrier, and a fourth ring gear of the fourth planetary gear set; and
the thirteenth, fourteenth, and fifteenth rotational elements of the fifth planetary gear set are respectively a fifth sun gear, a fifth planet carrier, and a fifth ring gear of the fifth planetary gear set.

12. The planetary gear train of claim 7, wherein the first, second, third, fourth, and fifth planetary gear sets are arranged in an order of the second, first, third, fourth, fifth planetary gear set from an engine side.

13. A planetary gear train of an automatic transmission for a vehicle, comprising:
an input shaft configured to receive an engine torque;
an output shaft configured to output a shifted torque;
a first planetary gear set having first, second, and third rotational elements;
a second planetary gear set having fourth, fifth, and sixth rotational elements;
a third planetary gear set having seventh, eighth, and ninth rotational elements;
a fourth planetary gear set having tenth, eleventh, and twelfth rotational elements;
a fifth planetary gear set having thirteenth, fourteenth, and fifteenth rotational elements;
a first shaft fixedly connected with the second rotational element, the fifth rotational element, and the input shaft;
a second shaft fixedly connected with the fourteenth rotational element and the output shaft;
a third shaft fixedly connected with the eighth rotational element and the thirteenth rotational element;
a fourth shaft fixedly connected with the eleventh rotational element and the fifteenth rotational element;
a fifth shaft fixedly connected with the sixth rotational element;
a sixth shaft fixedly connected with the ninth rotational element and the twelfth rotational element;
a seventh shaft fixedly connected with the tenth rotational element; and
eighth and ninth shafts comprising a rotation element of the first, second, and third planetary gear sets that is not fixedly connected with any of the first to seventh shafts, wherein the eighth and ninth shafts are configured to selectively connect to the transmission housing through brakes.

14. The planetary gear train of claim 13, wherein:
the first and seventh shafts, the third and fifth shafts, and the fourth and fifth shafts are configured to selectively interconnect one another through clutches;
the eighth shaft is fixedly connected with the first rotational element and the seventh rotational element; and
the ninth shaft is fixedly connected with the third rotational element and the fourth rotational element.

15. The planetary gear train of claim 14, further comprising:
a first clutch arranged between the first shaft and the seventh shaft;
a second clutch arranged between the third shaft and the fifth shaft;
a third clutch arranged between the fourth shaft and the fifth shaft;
a first brake arranged between the eighth shaft and the transmission housing;
a second brake arranged between the ninth shaft and the transmission housing; and
a third brake arranged between the third shaft and the transmission housing.

16. The planetary gear train of claim 13, wherein:
the first, second, and third rotational elements of the first planetary gear set are respectively a first sun gear, a first planet carrier, and a first ring gear of the first planetary gear set;
the fourth, fifth, and sixth rotational elements of the second planetary gear set are respectively a second sun gear, a second planet carrier, and a second ring gear of the second planetary gear set;
the seventh, eighth, and ninth rotational elements of the third planetary gear set are respectively a third sun gear, a third planet carrier, and a third ring gear of the third planetary gear set;
the tenth, eleventh, and twelfth rotational elements of the fourth planetary gear set are respectively a fourth sun gear, a fourth planet carrier, and a fourth ring gear of the fourth planetary gear set; and
the thirteenth, fourteenth, and fifteenth rotational elements of the fifth planetary gear set are respectively a fifth sun gear, a fifth planet carrier, and a fifth ring gear of the fifth planetary gear set.

17. The planetary gear train of claim 13, wherein the first, second, third, fourth, and fifth planetary gear sets are arranged in an order of second, first, third, fourth, fifth planetary gear set from an engine side.

* * * * *